March 7, 1961  T. M. COLE  2,974,259
CIRCUIT BREAKERS AND PANELBOARDS THEREFOR
Filed Oct. 23, 1957
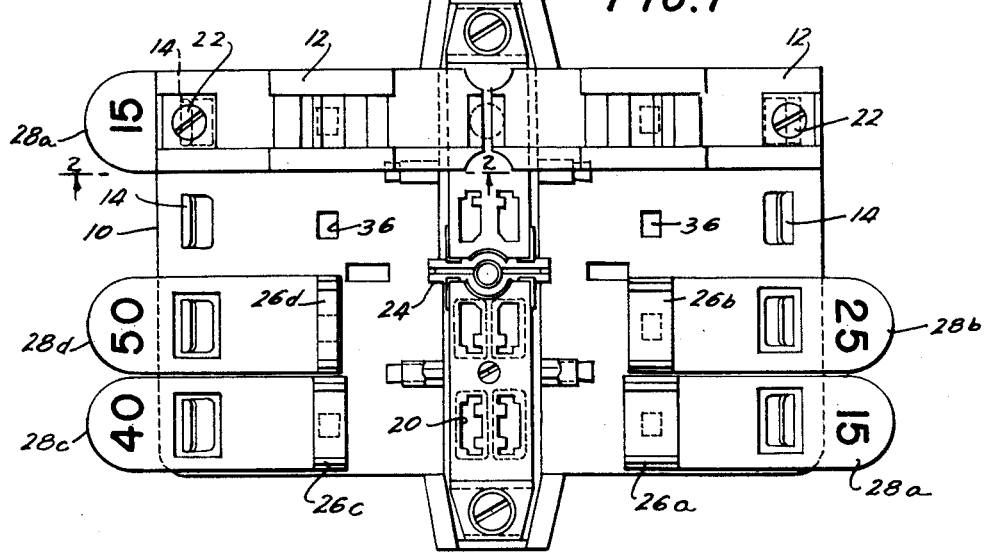
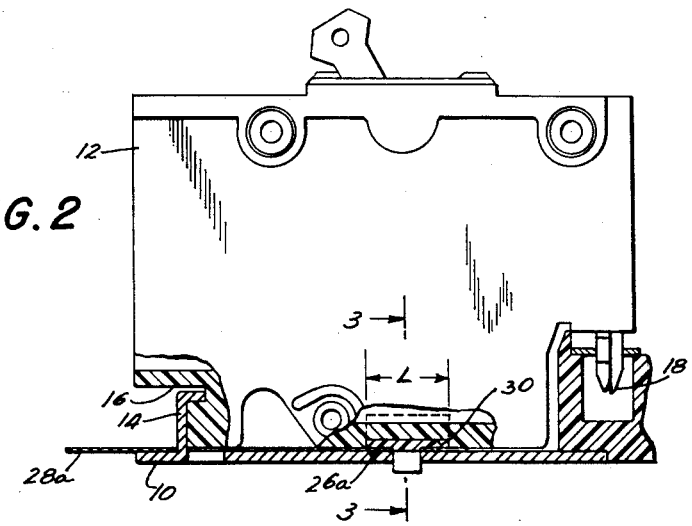
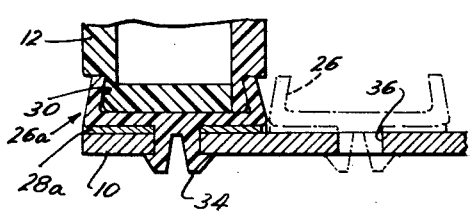
INVENTOR.
THOMAS M. COLE
BY Paul S. Martin
ATTORNEY United States Patent Office 2,974,259
Patented Mar. 7, 1961

2,974,259
CIRCUIT BREAKERS AND PANELBOARDS THEREFOR

Thomas M. Cole, Harrison, N.Y., assignor to Federal Pacific Electric Company, a corporation of Delaware Filed Oct. 23, 1957, Ser. No. 691,998

14 Claims. (Cl. 317—119)

The present invention relates to improvements in circuit breakers and circuit breaker panelboards, particularly of the plug-in type.

The purpose of circuit breaker panelboards is to protect the wires of branch circuits from a central distribution point. Each circuit breaker is selected so as to have the proper rating for protecting the wire of its branch circuit, corresponding to the gauge of wire used. Panelboards are generally manufactured as highly flexible units of modular design so as to receive circuit breakers of any desired ratings that may be required in the installation, within a wide range of ratings, and the circuit breakers themselves are physically interchangeable in the panelboard, regardless of their ratings (within a very broad range). For example, various sizes of panelboards may be made for accommodating up to sixteen or more circuit breakers, of any standard rating in the range 15 amperes to 100 amperes. In wiring such a panelboard, the electrician should select a circuit breaker for each protected branch circuit corresponding to its wire gauge. For example, #14 gauge branch-circuit wire calls for a 15 ampere circuit breaker.

The problem arises that the circuit breaker may trip frequently in use due to overloading, and to avoid the resulting inconvenience the user may substitute a much heavier circuit breaker in the space occupied by the original circuit breaker. As an example, a 30-ampere circuit breaker may be substituted for 15-ampere circuit breaker where (as is customary) both ratings are physically and mechanically interchangeable so as to be capable of assembly in a standardized, highly flexible panelboard. The result is that the original purpose of the circuit breaker, to protect the wiring, may be defeated. The substituted circuit breaker will not trip when a sustained excessive current is carried by the improperly protected branch-circuit wire.

An object of the present invention is to provide novel means for enabling standard and highly flexible circuit breaker panelboards to be adapted to receive circuit breakers of standardized proportions but of different ratings, and to forestall the easy, indiscriminate later substitution of circuit breakers of heavy ratings in place of the previously installed circuit breakers of lower ratings. A further object is to provide circuit breakers of novel construction which facilitates the conversion of a standard panelboard to receive only circuit breakers of a selected limited rating in any one circuit-breaker-receiving location. In this way, worn-out or defective circuit breakers can be replaced by others of the same ratings but a panelboard which was originally designed for receiving any rating of circuit breaker in any location may be converted so as to make the installed circuit breakers of any ratings not interchangeable with the circuit breakers of higher ratings. A further object of the invention is to provide novel means that may be either used or discarded for either rendering a panelboard "non-interchangeable" or for preserving its original flexible characteristic, as may be preferred or required.

A further and related object is to provide novel means for converting panelboards to receive circuit breakers of specific ratings or rating classifications in the several breaker-receiving spaces of the panelboard.

Except where otherwise clearly intended, the term "panelboard" is used in connection not only with such units which are designed to accommodate multiple circuit breakers, but also with units in which only a single circuit breaker or a two-pole circuit breaker is used. Further, as previously indicated, the circuit breakers here of concern are generally those which are of uniform physical proportions so as to be interchangeable when initially installed. It should be understood in this connection that multi-pole circuit breakers of standard proportions are made, in which a three-pole circuit breaker occupies the space available in the panelboard for three single-pole circuit breakers and, correspondingly, a two-pole circuit breaker occupies the space normally available to two separate single-pole circuit breakers. Two-pole and three-pole circuit breakers have separate line terminals for connection to portions of the in-put bus that are energized at different potentials as, for example, the two outside legs of a three-wire single phase system in which a two-pole circuit breaker may be used to protect a load connected to those two outside legs of the system. Two single-pole circuit breakers having line-terminal connection means for only one side of the line, and whose combined outside configuration is equal to that of full-size single-pole circuit breakers may be treated as the equivalent of a single-pole circuit breaker. A two-pole circuit breaker may be distinguished from a dual single-pole circuit breaker since the former involves a common trip mechanism for the two poles, and each pole occupies the modular panelboard space of a full-size circuit breaker and has two line terminals spaced properly for connection to different sides of the panelboard bus.

The illustrative embodiment of the invention described in detail below involves a member applied to a flexible or versatile panelboard for classifying each circuit-breaker-receiving modular space of the panelboard according to the rating or rating classification of the circuit breaker initially installed in that space. The member has a portion that locks to the panel and a portion that obstructs heavier-rated circuit breakers from being substituted. The obstructing portion is received in a corresponding space in its related circuit breaker and obstructs heavier-rated circuit breakers. The portion of the circuit breakers complementary to the rating classifying member may differ as to shape, or size or location. Inherently a long obstructing portion such as that of the illustrative embodiment is of different shape and in some measure occupies a different location in the modular circuit-breaker-receiving space of the panelboard than a smaller obstructing portion.

A more specific feature of this invention resides in a readily separable engagement between the circuit breaker and the rating-classification member enabling the two to be handled as a unit and applied to the panelboard concurrently. An interlocking engagement is provided for causing the rating-classification member to be locked to the panelboard. Subsequent removal of the circuit breaker leaves the rating-classifying member in place on the panelboard. The same circuit breaker can be installed again, or another (stripped of its rating-classification member) can be substituted. The substitute can be of the same rating or, as will appear, of a lower rating.

The present application has application to circuit breakers of the two types which are presently in wide use, namely, to those having screw-connectors for both the protected branch circuit and for the bus, respectively, as well as to the plug-in type of circuit breaker usually having a screw connector for the protected branch circuit and having a plug-in type of terminal for the bus of the panelboard.

The invention has special merit in connection with plug-in circuit breakers of the general types in Patent No. 2,647,225, issued July 18, 1953, to the present applicant jointly with P. M. Christensen. In the disclosed embodiments of that patent, a mechanical separable hinge is formed by a hook that projects from the panelboard and a recess at one end of the circuit breaker, and a plug-in terminal is provided at the opposite end of the circuit breaker. This construction provides a guide and leverage to enable the electrician to drive the plug-in terminal of the circuit breaker into engagement with the bus of the panelboard in order to make electrical connection. The separable hinge is here utilized for the new purpose of driving the rating-classifying member carried by the circuit breaker into locking engagement with the panelboard. When the rating-classifying member is carried by a plug-in circuit breaker, and particularly to plug-in circuit breakers in which leverage is obtainable from the separable hinge a particularly effective combination results. The same operation that is required to plug the circuit breaker in, also establishes the interlock connection between the panelboard and the rating-classifying member initially carried by the circuit breaker.

The rating-classifying member is easily separated from the circuit breaker, by manual effort, in contrast to the firm locking engagement of that member with the panelboard after installation. The engagement of the rating classification member with the circuit breaker is by means of friction or a yieldable detent or both, whereas the engagement of the member with the panelboard provides positive interlocking connection. By virtue of this feature of the invention, the application of the rating classification to the panelboard is an automatic incident of the assembly of the circuit breakers themselves to the panelboard. Furthermore assurance is provided that in each region where a circuit breaker is mounted the corresponding rating-classification member is installed.

A further feature of the invention resides in the provision of means enabling inspection of a panelboard complete with the circuit breakers to check on the application of the rating-classification members to the panelboard. The rating classification devices, as will be seen in the illustrative embodiment below, advantageously include an indicator that projects beyond the area of the panelboard that is controlled by the circuit breaker which ordinarily conceals the projecting portion of the rating classifying member. Such indicator may be provided with indicia showing the rating classification. This is readily checked against the branch circuit wire and the rating of the circuit breaker already assembled to the panelboard and without requiring disassembly for inspection.

The nature of the invention and its further features and advantages will be more fully appreciated from the following detailed description of an illustrative embodiment thereof, which is shown in the accompanying drawings forming a part of the disclosure of the invention. In the accompanying drawings:

Figure 1 is the plan view of a panelboard embodying features of the present invention;

Figure 2 is an elevation, partly in section along the line 2—2 of Fig. 1 but drawn to somewhat larger scale;

Figure 3 is a fragmentary cross-section of the apparatus in Figure 2 along the line 3—3 of Figure 2.

A circuit breaker panelboard 10 is shown in Fig. 1 having two circuit breakers 12 mounted thereon. The panelboard illustrated has eight modular spaces provided for receiving these standard circuit breakers 12, standard in that their form and outline are virtually identical, and in that each is provided with a mechanical securing means at one end and a plug-in terminal connection at the other end. These circuit breakers are provided with distinguishing reliefs which differ according to their respective current rating classifications as will be seen. The panelboard includes an integral hook 14 in each circuit breaker-receiving region, and the circuit breaker has a recess 16 that cooperates with hook 14 in the manner of a separable hinge during installation of the circuit breaker. When the circuit breaker is initially being installed, the circuit breaker as viewed in Fig. 2 slants upward to the right and the elements 14 and 16 are engaged in the manner of a separable hinge, and thereafter the circuit breaker is swung into the fully assembled position shown.

At its right-hand extremity as viewed in Fig. 2, circuit breaker 12 has a plug-in metal terminal 18 that tightly fits the slot of a metal bus bar forming part of the panelboard. In order that the two "hot" outside legs of a three-wire single phase circuit may supply the panelboard, the bus of the panelboard is divided into two parts separated by an insulating projection 24 that is interposed between these bus sections. A two-pole circuit breaker may be plugged into the two sections of the bus with the poles of the circuit breaker above and below (as viewed in Fig. 1) the insulating divider 24. Such two-pole circuit breaker naturally occupies two regions in the panelboard formed to receive two single pole circuit breakers. For present purposes, therefore, two-pole circuit breakers may be treated exactly as if they were two single pole circuit breakers. The panelboard is shown in Fig. 1 as being equipped with five rating-classification devices, only four of which are shown in their entirety and the fifth of which is partly concealed by the left-hand circuit breaker 12. These circuit breaker classifying devices include two parts, the rating classification element 26a, 26b, 26c and 26d and an indicator 28 associated with each member 26. These indicators project outside the area concealed by the circuit breakers 12 when installed on the panelboard. The projecting portions of indicators 28d bear indicia representing the respective ratings of the mounted circuit breakers.

The various rating-classification members 26a, 26b, 26c and 26d differ physically so as to reject circuit breakers of heavier ratings than those identified by the indicators 28. As seen in the drawing, the smallest rating classification member 26d has a portion which projects forward of the panelboard and would naturally require a circuit breaker relieved to accommodate that projecting part. Thus, the circuit breaker whose rating is 50 amperes and is designed to cooperate with the member 26d has a relief formed at the bottom of its casing that is complementary to the projecting portion of its member 26d. The next larger rating-classification member 26c corresponding to the 40 ampere indicator would reject a circuit breaker whose casing has a relief only sufficient to receive rating classification member 26d. Correspondingly, rating-classification member 26b would reject circuit breakers having reliefs complementary to members 26c and 26d, the latter circuit breakers having heavier current ratings. The largest rating classification member 26a corresponding to a 15 ampere circuit breaker would reject circuit breakers having reliefs for members 26b or 26c or for accommodating only the member 26d.

The illustrated rating classification members 26 obviously differ in size, and they also necessarily differ in form. It is further apparent, as will be seen from a comparison of members 26a and 26b, that a portion of the lower-rated circuit breaker occupies a location above the panelboard different from all parts of member 26d. In this respect, each of the members 26 occupies a portion of the panelboard that is different from that portion of the panelboard occupied by the rating-classification members that are identified with heavier ratings.

The circuit breakers 12 have rigid cases, and these are relieved to provide a recess 30 for that member 26 which corresponds to its rating. The relief 30 occupies a length L that is different for the different classifications, as appears in Fig. 1. Member 26 has a sloping wall portion 32 at each side of the circuit breaker so as to embrace the circuit breaker and form a frictional grip to the circuit breaker that is effective to maintain the member 26 assembled to its circuit breaker 12 prior to assembly to the panelboard. Member 26 may be made of any suitable material, either metal or plastic, preferably of a material that resiliently retains the illustrated form. Nylon is a material well-suited to this purpose. The sloping walls 32 of member 26 form a pair of yielding, resilient detents that enhance the frictional engagement of member 26 with the circuit breaker 12. As seen in Fig. 3, it is easily possible for a circuit breaker 12 to be removed from the assembled position illustrated, in which event the side portions 32 would be momentarily deflected outward. Subsequently, during insection of another circuit breaker 12 to replace the removed circuit breaker the side portions 32 would again be deflected outward. It is clear from Fig. 3 that this outward deflection would not interfere with the members 26 in the adjoining region of the panelboard.

Member 26 has a downward projecting interlocking part 34 that is divided into two portions each of which has a hook or shoulder that locks the member 26 to the panelboard. This part 34 projects through an opening 36 provided in the panelboard, in the proper location to admit member 26 when the circuit breaker is mounted in the normal region intended for it. Holes 36 are provided in the same position in each of modular circuit breaker receiving regions of the panelboard, irrespective of the configuration of the circuit breaker rating classifying member that it is to receive. In this way, the panelboard is completely flexible as to the combination of circuit breakers of different ratings that may be mounted on it yet, once a circuit breaker has been assembled to the panelboard, together with its rating classification member 26, the panelboard thereafter becomes "non-interchangeable" in the sense that circuit breakers of heavier current ratings will be obstructed by the previously inserted members 26 locked to the panelboard, and will allow only circuit breakers of the original classification (or lower) to be mounted in each classified region.

Indicator element 28 is secured to the rating classification member 26, and (Figs. 2 and 3) is confined between that member and the panel 10 in the completed panelboard.

In the panelboard of Fig. 1, three of the regions are shown as lacking rating-classification members 26 and indicators 28, and these may be used for any desired circuit breaker rating; but once a circuit breaker of a given rating has been applied together with its rating classification device 26—28, thereafter that region is limited against use of a circuit breaker having a heavier current rating. The right-hand circuit breaker 12 in Fig. 1 is evidently of a rating greater than 50 amperes whereas the left-hand circuit breaker is a 15-ampere circuit breaker. Each circuit breaker having a rating of 50 amperes, 40 amperes, 25 amperes, or 15 amperes has a relief complementary to the respective projecting parts of members 26a, 26b, 26c and 26d. A 25-ampere circuit breaker is of the same classification as a 25 ampere and has an identical relief as to size, location and configuration, and a 30 ampere circuit breaker is correspondingly classed with the 40 ampere circuit breaker and relieved accordingly. Naturally, where practical, each member 26 for each different rating of circuit breaker may be different from the others, its length L varying inversely with its rating.

It is not intended that the panelboard shall permanently be limited to the initially installed circuit breakers. On occasion, it becomes necessary to rewire an installation and to substitute appropriate circuit breakers corresponding to the wiring newly installed, in which event members 26 can be forcibly removed and replaced as in an original installation.

In a modified form of a broad aspect of the invention, a series of holes 36 may be provided in a series of positions in each modular circuit-breaker receiving region, and every rating-classification member may be alike in size but located wholly in a characterizing position on its circuit breaker, corresponding to the rating of that circuit breaker. Each circuit breaker, with a relief only in a corresponding position in the circuit breaker related to its rating, would then be rejected from a panelboard region previously identified with a different rating by a rating classification device locked in place. This modification has the disadvantage of introducing numerous holes in the panelboard, which is often the rear wall of the enclosure and which therefore should have a minimum of openings for safety.

Various additional modifications of the above embodiments of the invention will readily occur to those skilled in the art, and therefore the invention should be broadly construed in accordance with its full spirit and scope.

What is claimed is:

1. A circuit breaker panelboard having means for securing a circuit breaker thereon, said panelboard including a circuit-breaker supporting panel, and one of a series of rating-classification members having interlocking engagement with the panel and adapted to mate with a characterizing relief in a circuit breaker of a particular rating and to act as an obstruction against mounting of circuit breakers of other ratings not having a relief for said one member, and an indicator distinctively identified with the rating classification member extending to a location outside that portion of the panelboard that is covered by a circuit breaker when mounted.

2. In a combination, a circuit breaker and a panelboard having a region in which said circuit breaker is mounted, said circuit breaker and said panelboard including separable hinge mechanical retaining means and plug-in electrical bus connection means spaced from said separable hinge means, a rating classification member interposed between the panelboard and the circuit breaker and between said mechanical means and said electrical means for classifying the panelboard region according to the rating classification of the mounted circuit breaker, said member having plug-in locking engagement with the panelboard at an invariable position thereof in relation to the circuit breaker receiving region independent of the circuit breaker rating, said circuit breaker having a relief that is characteristic of its rating, said member having a projecting portion that is complementary to said relieved portion of the circuit breaker, said projecting portion of said member being physically distinctive as by size or location or position or combinations of these to reject circuit breakers of heavier rating classifications not having reliefs accommodating said member, and a rating indicator extending from said member to a position of clearance outside the area of the panelboard occupied by said circuit breaker.

3. In combination, a circuit breaker and a panelboard having a region in which said circuit breaker is mounted, a rating classification member interposed therebetween and mounted on said panelboard for classifying the panelboard region according to the rating classification of the mounted circuit breaker, said circuit breaker having a relief that is characteristic of its rating, said member having a projecting portion that is complementary to said relieved portion of the circuit breaker, said projecting portion of said member being physically distinctive to reject circuit breakers of heavier rating classifications not having reliefs accommodating said member, and a rating indicator extending from said member to a position of clearance outside the area of the panelboard occupied by said circuit breaker.

4. In combination, a series of circuit breakers of various rating classifications and a panelboard mounting said circuit breakers in modular circuit-breaker receiving regions thereof, said panelboard including mechanical retaining means and electrical bus connection to each circuit breaker, a member locked to the panelboard and yieldably engaged with the circuit breaker in at least certain of said regions for classifying each such region according to the circuit breaker rating classification mounted thereon, each said member having a projecting portion that is complementary to a corresponding relieved portion of the related circuit breaker, said projecting portions of said members of different ratings being physically distinctive to reject circuit breakers of respectively heavier rating classifications, and a rating indicator extending from said member to a position of clearance outside the area of the panelboard occupied by said circuit breaker.

5. A series of circuit breakers of different rating classifications having insulating cases of generally identical outline, each releasably bearing a distinctive rating-classification member in a complementary relief in the circuit breaker case unique to the particular current-rating classification of the circuit breaker and having a plug-in interlock part adapted to interengage with and be retained by a cooperating plug-in interlock part of a circuit-breaker receiving region of a panelboard whereby to convert such region to rejecting circuit breakers of heavier rating classifications.

6. A series of circuit breakers of different ratings in accordance with claim 5, in which said rating-classification members and the complementary reliefs in the circuit breaker cases are inversely related in size to the current-rating classification of the circuit breaker.

7. A circuit breaker adapted to be mounted on a panel board having various discrete regions where the circuit breaker may be mounted, said circuit breaker including a rating classification member yieldably secured to the exterior thereof and having a plug-in interlocking portion adapted to engage and lock to a cooperating interlocking portion of a panelboard on which the circuit breaker is to be mounted, said member having a rating indicator projecting to a position of clearance.

8. A circuit breaker adapted to be mounted on a panelboard having various discrete regions where the circuit breaker may be mounted, said circuit breaker including a casing having a distinctive relief uniquely related to its rating, and a rating classification member yieldably secured to the exterior of the casing in said relief and complementary thereto and having a plug-in interlock portion adapted to engage and lock to a plug-in cooperating interlock portion of a panelboard on which the circuit breaker is to be mounted.

9. A circuit breaker having a case of insulation and mounting means and plug-in electrical terminal means adapted to be received in the mounting location of a panelboard, and a rating classification member adapted to be interposed between said circuit breaker and a panelboard to which the circuit breaker is to be mounted, said rating classification member having a formation cooperable in plug-in locking engagement with a companion locking portion of the panelboard to which the circuit breaker is to be mounted, said circuit breaker and said rating classification member including resilient means securing them yieldably in assembly to each other, said circuit breaker case having a relieved formation characteristic of the rating thereof and a projecting portion of said rating classification member being complementary to said relieved formation.

10. An elongated circuit breaker having longitudinally spaced hook-like mounting means and plug-in electrical terminal means adapted to be received in the mounting location of a panelboard, and a rating classification member adapted to be interposed between the bottom of said circuit breaker and the panelboard to which the circuit breaker may be mounted, said rating classification member having at least one resilient projecting hook-like formation adapted to enter a hole in a panelboard and to snap into locking engagement thereto incidental to mounting of the circuit breaker on the panelboard, said circuit breaker having a relieved formation at the bottom thereof and spaced from said mounting means and said terminal means, and said rating classification member having a projecting portion complementary to said relieved formation and including a resilient portion embracing said circuit breaker and yieldably secured thereto.

11. In combination an elongated circuit breaker having longitudinally spaced hook-like mechanical mounting and plug-in electrical connecting means, a panelboard member confronting the bottom of said circuit breaker and having mounting and connecting means defining a circuit breaker receiving location on said member, said member having a hole in said location, and a rating classification member between said spaced mounting and connecting means and interposed between said circuit breaker and said mounting member, said classification member having a projecting resilient locking hook through said hole and a resilient portion embracing and yieldably secured to said circuit breaker at the bottom thereof and at a point between said mounting means and electrical connecting means, said circuit breaker having a relieved formation at the bottom thereof characteristic of the circuit breaker rating and said resilient portion of said rating classification member having a projecting formation complementary to said relieved formation.

12. In combination, a circuit breaker having a casing formed with relatively large opposed sides, relatively long and narrow ends and relatively long and narrow top and bottom surfaces, a mounting member for said circuit breaker including means defining a circuit breaker mounting location confronting the bottom of the circuit breaker, and a rating classification member in said location interposed between said circuit breaker and said mounting member and having a plug-in locking connection to said mounting member, said rotating classification member including a resilient yieldable interconnection to said circuit breaker, said circuit breaker having a relieved formation characteristic of the rating thereof and a portion of said rating classification member being complementary to said relieved formation.

13. In combination, a plurality of circuit breakers of different rating classifications, a mounting member supporting said circuit breakers, and rating classification members interposed between said mounting member and at least two of said circuit breakers, respectively, said rating classification members having a locking connection to said mounting member, said circuit breakers of different rating classifications having correspondingly different formations and said rating classification members being complemental thereto.

14. In combination, a plurality of circuit breakers of different rating classifications, a mounting member supporting said circuit breakers, and rating classification members interposed between said mounting member and at least two of said circuit breakers, respectively, said rating classification members having a plug-in locking connection to said mounting member, said circuit breakers of different rating classifications having correspondingly different formations and said rating classification members being complemental to said formations and yieldably connected to said circuit breakers.

References Cited in the file of this patent

UNITED STATES PATENTS

| | | |
|---|---|---|
| 1,832,194 | Esser | Nov. 17, 1931 |
| 1,838,808 | Conant | Dec. 29, 1931 |
| 2,281,958 | Snavely | May 5, 1942 |
| 2,766,405 | Edmunds | Oct. 9, 1956 |
| 2,869,043 | Locher | Jan. 13, 1959 |

OTHER REFERENCES

Federal Noark Cat., 1000A-July 1953, 3 pages.